US012634610B2

(12) United States Patent
Chen et al.

(10) Patent No.: US 12,634,610 B2
(45) Date of Patent: May 19, 2026

(54) SPEAKER BOX

(71) Applicant: AAC Microtech (Changzhou) Co., Ltd., Changzhou (CN)

(72) Inventors: Pinsong Chen, Changzhou (CN); Li Ren, Changzhou (CN)

(73) Assignee: AAG Microtech (Changzhou) Co., Ltd., Changzhou (CN)

(*) Notice: Subject to any disclaimer, the term of this patent is extended or adjusted under 35 U.S.C. 154(b) by 195 days.

(21) Appl. No.: 18/525,898

(22) Filed: Dec. 1, 2023

(65) Prior Publication Data

US 2024/0340566 A1 Oct. 10, 2024

Related U.S. Application Data

(63) Continuation of application No. PCT/CN2023/087276, filed on Apr. 10, 2023.

(51) Int. Cl.
*H04R 1/02* (2006.01)
*H04R 1/28* (2006.01)

(52) U.S. Cl.
CPC ............. *H04R 1/025* (2013.01); *H04R 1/288* (2013.01); *H04R 2400/11* (2013.01)

(58) Field of Classification Search
CPC ..... H04R 1/025; H04R 1/288; H04R 2400/11
USPC .......................................................... 381/386
See application file for complete search history.

(56) References Cited

U.S. PATENT DOCUMENTS

| | | | | |
|---|---|---|---|---|
| 11,943,596 | B2 * | 3/2024 | Chen | H01F 3/14 |
| 12,143,793 | B2 * | 11/2024 | Yu | H04R 7/20 |
| 12,289,573 | B1 * | 4/2025 | Chen | H04R 9/02 |
| 2018/0310094 | A1 * | 10/2018 | Li | H04R 9/06 |
| 2020/0382875 | A1 * | 12/2020 | Zhao | H04R 9/06 |

* cited by examiner

*Primary Examiner* — Sean H Nguyen
(74) *Attorney, Agent, or Firm* — Wiersch Law Group

(57) ABSTRACT

The present disclosure discloses a speaker box including a housing having a receiving space and a speaker unit received in the receiving space. The housing and the speaker unit encloses a front cavity and a rear cavity isolated from each other. A mesh disposed in the rear cavity is configured to enclose a filling chamber with the bottom cover for filling sound-absorbing particles. A steel sheet of the bottom cover includes a protrusion connected to the mesh. And, a damping member opposite to the protrusion is sandwiched between the mesh and the yoke; the speaker box in the present disclosure has higher drop reliability.

9 Claims, 5 Drawing Sheets

A-A

C

20

SPEAKER BOX

FIELD OF THE PRESENT DISCLOSURE

The present disclosure relates to electric-acoustic conversion technologies, especially relates to a speaker box applied in portable mobile terminals.

DESCRIPTION OF RELATED ART

With the development of the portable mobile terminal technologies, users have increasingly high requirements for the sound quality of portable mobile terminals. And a speaker box in portable mobile terminals is one of the necessary conditions to achieve this high-quality sound effect, which is configured to achieve conversion between electric signal and acoustic signal.

In related art, the speaker box includes a housing having a receiving space and a speaker unit received in the housing. Strong fixation strength is required to ensure the drop reliability of the speaker box. In general, to improve acoustic performance of the speaker box, sound-absorbing particles are filled into the rear cavity of the speaker box. A mesh is provided in the rear cavity to separate the speaker unit from the sound-absorbing particles. In order to avoid the resonance between the speaker unit and the sound-absorbing particles, the mesh is usually spaced apart from the speaker unit. However, the mesh cannot support the speaker unit resulting in reduction of the fixation strength between the speaker unit and the housing. Besides, providing damping foam between the mesh and the speaker unit may cause deformation of the mesh. Especially for speaker unit with large size, however, drop failure is prone to occur even providing the damping foam between the speaker unit and the mesh.

Therefore, it is necessary to provide an improved speaker box to overcome the problems mentioned above.

SUMMARY OF THE INVENTION

One object of the present disclosure is to provide a speaker box with higher drop reliability.

The speaker box includes a housing, having a receiving space, including: an upper cover, having a sound channel penetrating thereon; and a bottom cover enclosing the receiving space with the upper cover; a speaker unit received in the receiving space and mounted on the upper cover, including: a diaphragm configured to vibrate to generate sound, enclosing a front cavity with the upper cover; and a yoke spaced apart from the bottom cover; a mesh fixed to the cover; and a damping member sandwiched between the mesh and the yoke; wherein the front cavity is communicated with outside through the sound channel; a rear cavity is enclosed by the speaker unit, the upper cover, and the bottom cover; the rear cavity is divided into an inner cavity and a filling chamber isolated from each other by the mesh; the bottom cover includes a body portion having an opening, and a steel sheet inserted into the body portion and covering the opening; the steel sheet includes a protrusion recessed towards the speaker unit and fixed to the mesh; the damping member is arranged opposite to the protrusion.

As an improvement, the mesh is spaced apart from the yoke; a distance between the mesh and the yoke is between 0.1-0.2 mm.

As an improvement, a thickness of the damping member is 0.05-0.1 mm greater than the distance between the mesh and the yoke.

As an improvement, the protrusion includes a top wall fixed to the mesh; an area of the top wall is smaller than an area of the damping member.

As an improvement, the mesh is glued to the top wall.

As an improvement, the body portion includes a first fixation portion fixed to the upper cover, a second fixation portion fixed to the steel sheet, a central portion connecting the first fixation portion with the second fixation portion, and a third fixation portion extending from the central portion towards the speaker unit; an edge of the mesh is fixed to a surface of the third fixation portion away from the steel sheet.

As an improvement, the edge of the mesh is fixed to the third fixation portion by hot-melt adhesive.

As an improvement, the speaker box further includes a sealing member fixed to the steel sheet and covering a filling hole penetrating the steel sheet.

As an improvement, the damping member is made of foam.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
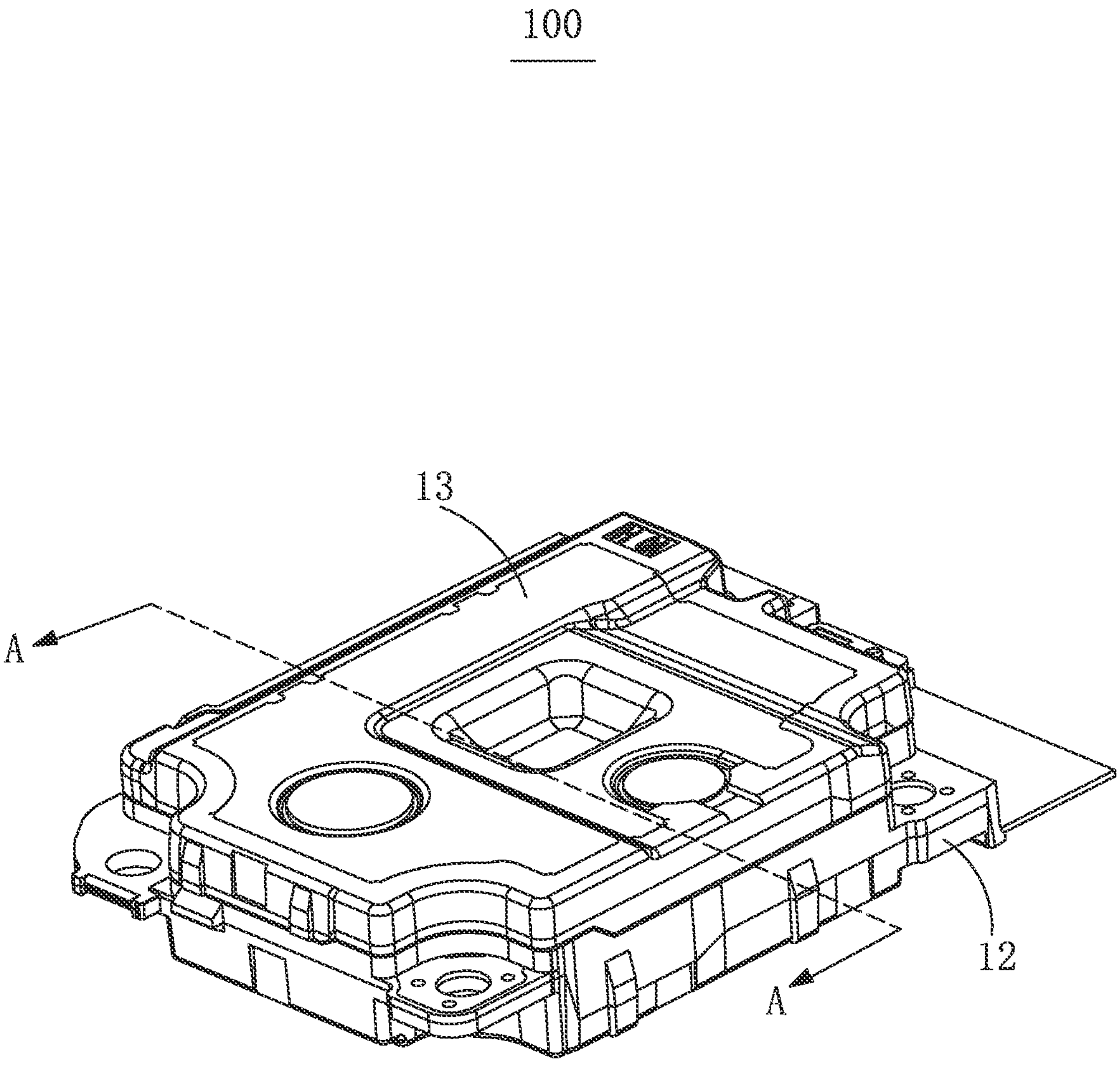
FIG. 1 is an isometric view of a speaker box in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-5 together, a speaker box 100 provided by an exemplary embodiment of the present disclosure includes a housing 10 having a receiving space 11, and a speaker unit 20 received in the receiving space 11.

To be specific, the housing 10 includes an upper cover 12, and a bottom cover 13 enclosing the receiving space 11 with the upper cover 12. The speaker unit 20 is mounted on the upper cover 12. The bottom cover 13 includes a body portion 132 having an opening 131, and a steel sheet 133 inserted into the body portion 132 and covering the opening 131.

Figure 6:
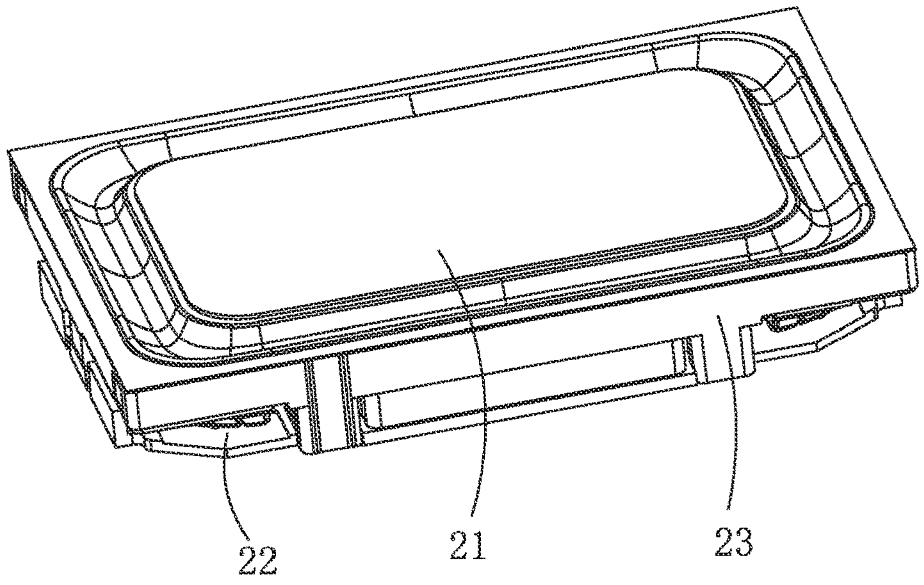
FIG. 6 is an isometric view of a speaker unit of the speaker box in FIG. 1.
Figure 7:
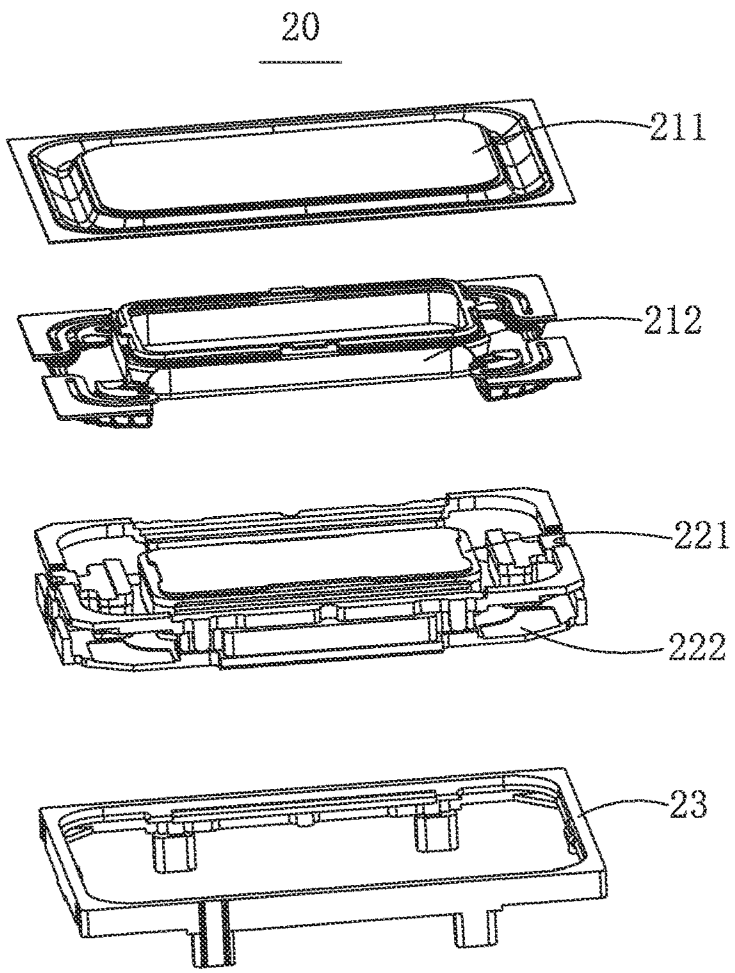
FIG. 7 is an exploded view of the speaker unit in FIG. 6.
Figure 8:
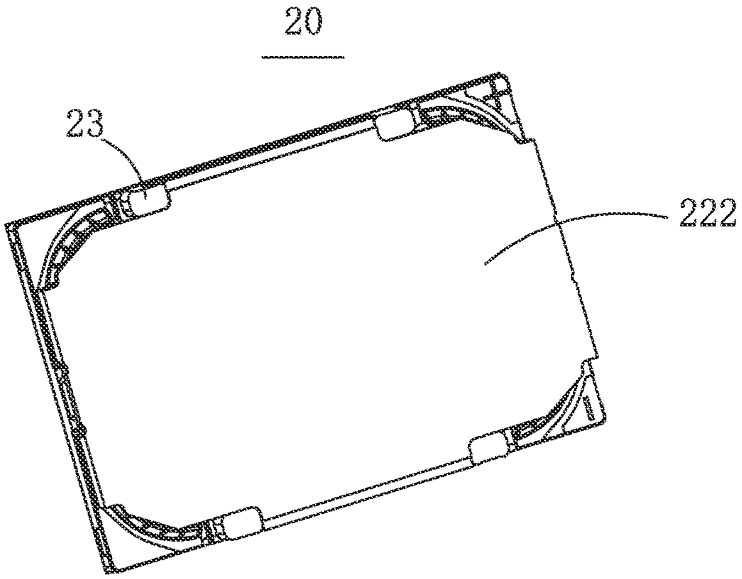
FIG. 8 is an isometric view of the speaker unit in FIG. 6.

As shown in FIGS. 6-8, in one embodiment, the speaker unit 20 includes a vibration system 21, a magnet system 22 configured to drive the vibration system 21 to generate sound, and a frame 23. The vibration system 21 and the magnet system 22 are both mounted on the frame 23. The vibration system 21 includes a diaphragm 211 configured to vibrate to generate sound and a coil 212 driven the diaphragm 211. The magnet system 22 includes a magnet 221 and a yoke 222. It should be noted that the specific structure of the speaker unit 20 is not limited in the present disclosure as long as it can generate sound normally.

Figure 3:
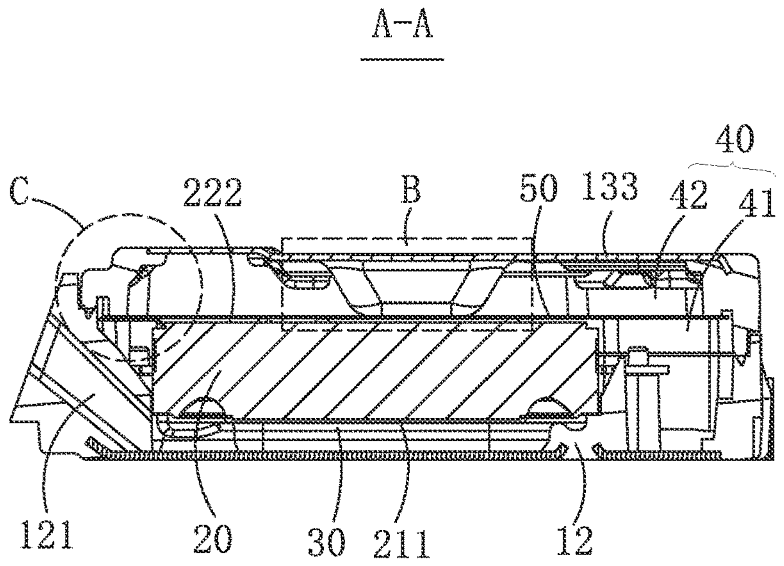
FIG. 3 is a cross-sectional view of the speaker box taken along line A-A in FIG. 1.
Figure 4:
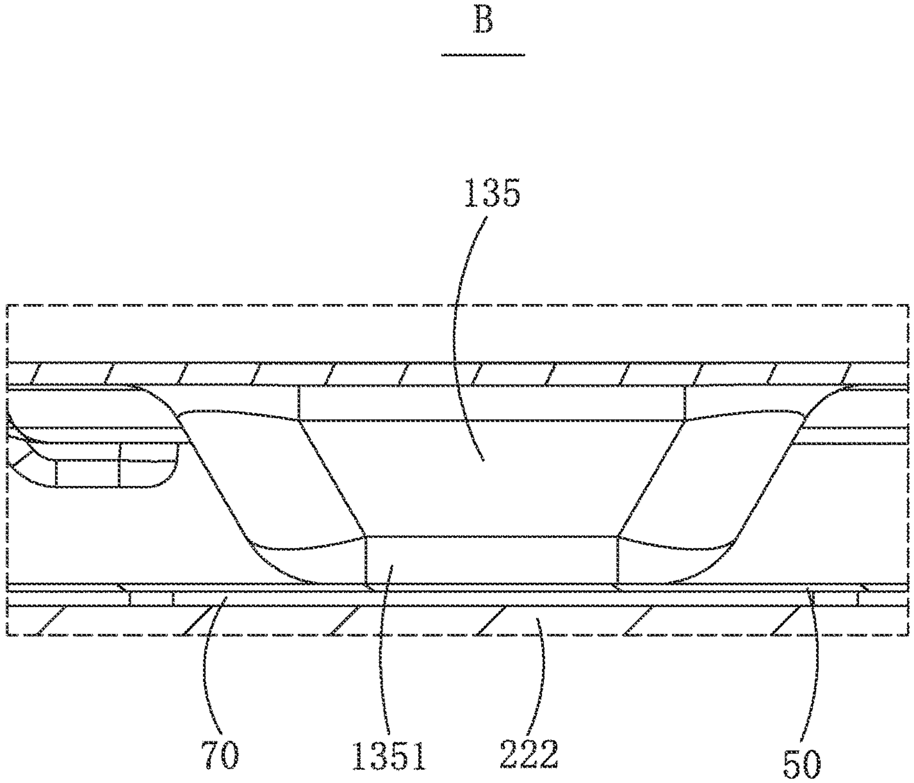
FIG. 4 is an enlarged view of part B in FIG. 3.
Figure 5:
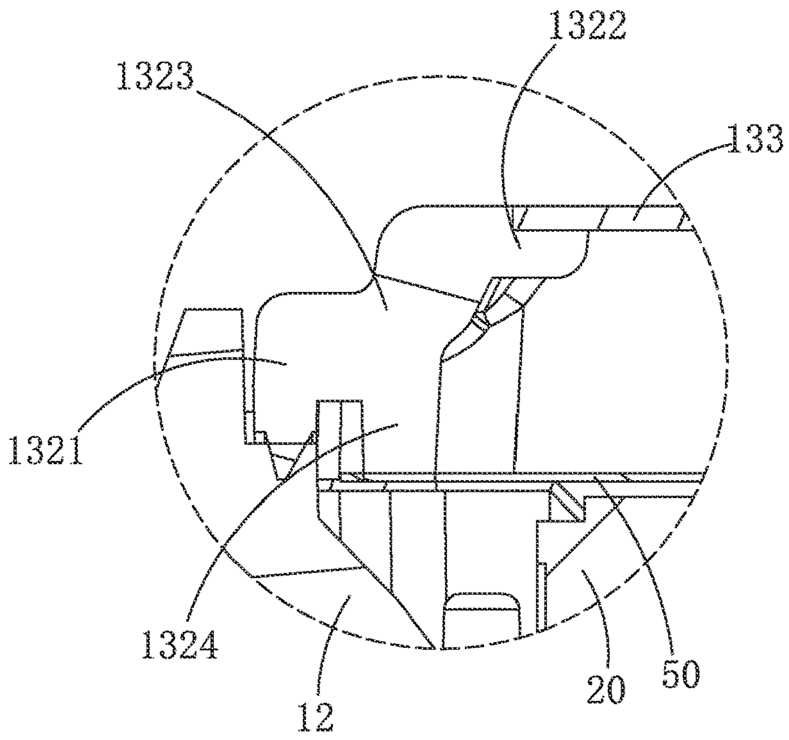
FIG. 5 is an enlarged view of part C in FIG. 3.

As shown in FIGS. 3-5, a front cavity 30 is enclosed by the diaphragm 211 and the upper cover 12. In order to transmit the sound wave generated by the speaker unit 20 to outside, a sound channel 121 is provided on the upper cover 12 by penetrating thereon. The sound channel 121 connects the front cavity 40 with outside. Besides, the speaker unit 20, the upper cover 12, and the bottom cover 12 enclose a rear cavity 40 jointly. The rear cavity 40 is isolated from the front cavity 30.

In order to improve the acoustic performance of the speaker box 100, the rear cavity 40 is filled with sound-absorbing particles. In particular, a mesh 50 is disposed in the rear cavity 40 to divide the rear cavity 40 into an inner cavity 41 and a filling chamber 42 isolated from each other. The sound-absorbing particles are filled in the filling chamber 42. The speaker unit 20 is located on a side of the mesh 50 away from the filling chamber 42. The mesh 50 is fixed to the bottom cover 13 thereby preventing the sound-absorbing particles from entering the speaker unit 20 and ensuring stable vibration ability of the speaker unit 20.

Figure 2:
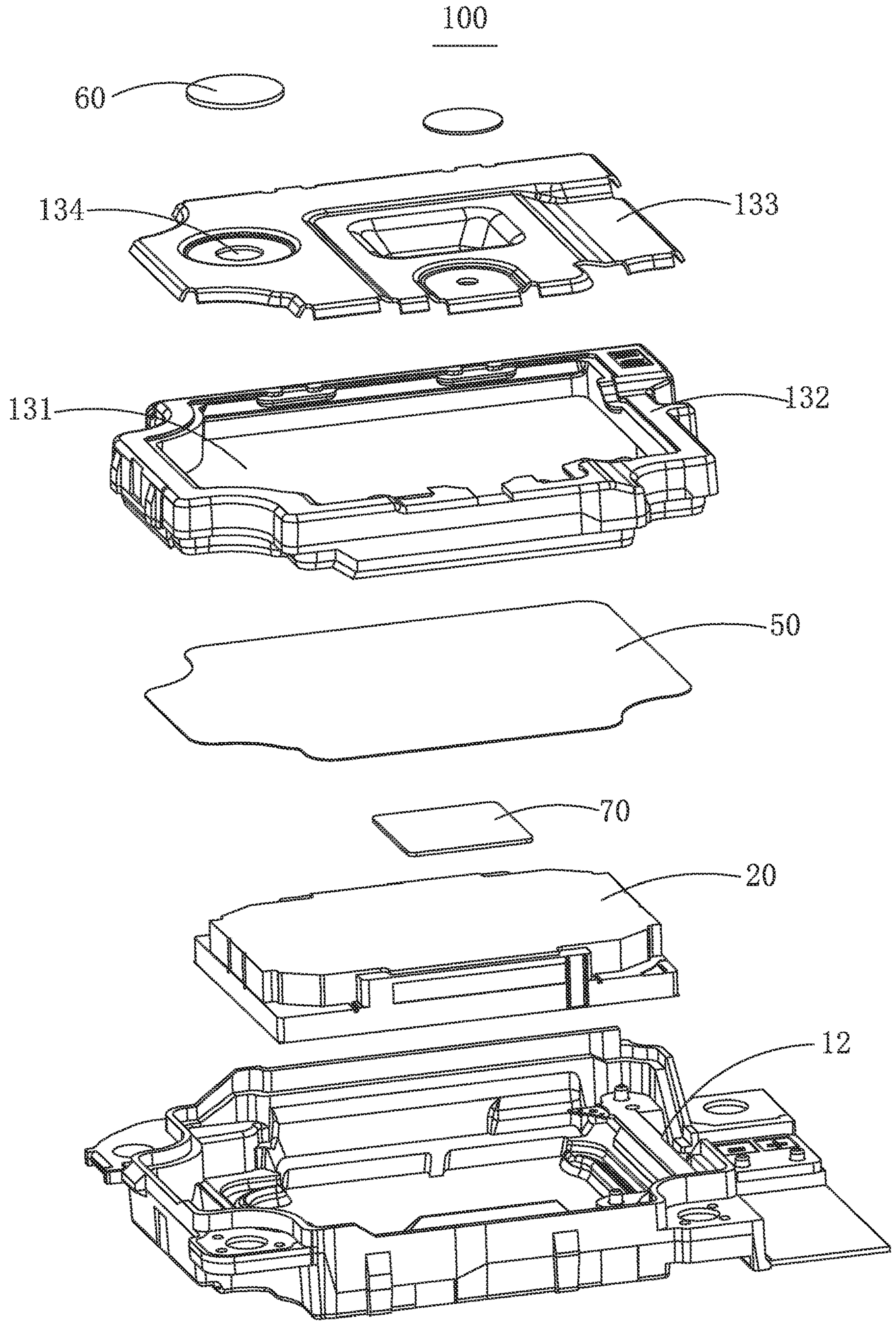
FIG. 2 is an exploded view of the speaker box in FIG. 1.

Concretely, the yoke 222 is disposed on a side of the mesh away from the filling chamber 42. As shown in FIG. 2, a filling hole 134 is provided on the steel sheet 133 for filling the sound-absorbing particles into the filling chamber 42. A sealing member 60 fixed to the steel sheet 133 is configured to cover the filling hole 134. Furthermore, the steel sheet 133 includes a protrusion 135 recessed towards the speaker unit 20 and connected to the mesh 50. The mesh 50 is spaced apart from the yoke 222 thereby avoiding the resonance between the speaker unit 20 and the sound-absorbing particles. Besides, a damping member 70 is sandwiched between the mesh 50 and the yoke 222. The damping member 70 is arranged opposite to the protrusion 135. In one embodiment, the damping member 70 is made of foam. In other embodiments, the damping member 70 could also be made of other materials having buffer function. In this manner, the damping member 70 further reduces the risk of resonance of the sound-absorbing particles. More specifically, a distance between the mesh 50 and the yoke 222 is between 0.1-0.2 mm. A thickness of the damping member 70 is 0.05-0.1 mm greater than the distance between the mesh 50 and the yoke 222, thus avoiding the risk of pulling damage of the mesh 50 caused by the excessively thick damping member 50. By fixing the mesh 50 to the protrusion 135 and providing a damping member 70 between the mesh 50 and the yoke 222, the speaker unit 20 is stably supported by the protrusion 135, thereby effectively improving the fixation strength between the speaker unit 20 and the housing 10 and the drop reliability of the speaker box 100.

As shown in FIGS. 3-4, the protrusion 135 includes a top wall 1351 fixed to the mesh 50. An area of the top wall 1351 is smaller than an area of the damping member 70. Therefore, the whole top wall 1351 is served to support the speaker unit 20. The mesh 50 is glued to the top wall 1351. So, the glue may also buffer the vibration generated by the housing 10.

As shown in FIG. 5, the body portion 132 includes a first fixation portion 1321 fixed to the upper cover 12, a second fixation portion 1322 fixed to the steel sheet 133, a central portion 1323 connecting the first fixation portion 1321 with the second fixation portion 1322, and a third fixation portion 1324 extending from the central portion 1323 towards the speaker unit 20. An edge of the mesh 50 is fixed to a surface of the third fixation portion 1324 away from the steel sheet 133. Specifically, the edge of the mesh 50 is fixed to the third fixation portion 1324 by hot-melt adhesive.

Compared with the related art, the speaker box in the present disclosure includes a housing having a receiving space and a speaker unit received in the receiving space. The housing and the speaker unit encloses a front cavity and a rear cavity isolated from each other. A mesh disposed in the rear cavity is configured to enclose a filling chamber with the bottom cover for filling sound-absorbing particles. A steel sheet of the bottom cover includes a protrusion connected to the mesh. And, a damping member opposite to the protrusion is sandwiched between the mesh and the yoke. By fixing the mesh to the protrusion and providing a damping member between the mesh and the yoke, the speaker unit is stably supported by the protrusion, thereby effectively improving the fixation strength between the speaker unit and the housing and the drop reliability of the speaker box.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box comprising:

a housing, having a receiving space, comprising:

an upper cover, having a sound channel penetrating thereon; and a bottom cover enclosing the receiving space with the upper cover;

a speaker unit received in the receiving space and mounted on the upper cover, comprising:

a diaphragm configured to vibrate to generate sound, enclosing a front cavity with the upper cover; and a yoke spaced apart from the bottom cover;

a mesh fixed to the bottom cover; and a damping member sandwiched between the mesh and the yoke; wherein the front cavity is communicated with outside through the sound channel; a rear cavity is enclosed by the speaker unit, the upper cover, and the bottom cover; the rear cavity is divided into an inner cavity and a filling chamber isolated from each other by the mesh;

the bottom cover comprises a body portion having an opening, and a steel sheet inserted into the body portion and covering the opening; the steel sheet comprises a protrusion recessed towards the speaker unit and fixed to the mesh; the damping member is arranged opposite to the protrusion.

2. The speaker box as described in claim 1, wherein the mesh is spaced apart from the yoke; a distance between the mesh and the yoke is between 0.1 mm-0.2 mm.

3. The speaker box as described in claim 2, wherein a thickness of the damping member is 0.05 mm-0.1 mm greater than the distance between the mesh and the yoke.

4. The speaker box as described in claim 1, wherein the protrusion comprises a top wall fixed to the mesh; an area of the top wall is smaller than an area of the damping member.

5. The speaker box as described in claim 4, wherein the mesh is glued to the top wall.

6. The speaker box as described in claim 1, wherein the body portion comprises a first fixation portion fixed to the upper cover, a second fixation portion fixed to the steel sheet, a central portion connecting the first fixation portion with the second fixation portion, and a third fixation portion extending from the central portion towards the speaker unit; an edge of the mesh is fixed to a surface of the third fixation portion away from the steel sheet.

7. The speaker box as described in claim 6, wherein the edge of the mesh is fixed to the third fixation portion by hot-melt adhesive.

8. The speaker box as described in claim 1, further comprising a sealing member fixed to the steel sheet and covering a filling hole penetrating the steel sheet.

9. The speaker box as described in claim 1, wherein the damping member is made of foam.

* * * * *